(12) United States Patent
Harris

(10) Patent No.: US 8,275,967 B2
(45) Date of Patent: Sep. 25, 2012

(54) STORAGE OF SEQUENTIALLY SENSITIVE DATA

(75) Inventor: Antony Harris, Reno, NV (US)

(73) Assignee: Bright Technologies, Inc., Reno, NV (US)

( * ) Notice: Subject to any disclaimer, the term of this patent is extended or adjusted under 35 U.S.C. 154(b) by 1140 days.

(21) Appl. No.: 12/075,739

(22) Filed: Mar. 13, 2008

(65) Prior Publication Data

US 2009/0235041 A1    Sep. 17, 2009

(51) Int. Cl.
*G06F 12/00* (2006.01)
(52) U.S. Cl. .................... 711/171; 711/173
(58) Field of Classification Search ............ 711/171, 711/173
See application file for complete search history.

(56) References Cited

U.S. PATENT DOCUMENTS

| 6,128,717 | A | 10/2000 | Harrison et al. |
| 6,430,135 | B1 | 8/2002 | Kelly et al. |
| 2002/0006265 | A1 | 1/2002 | Beyrouti |
| 2008/0155205 | A1* | 6/2008 | Gokhale et al. ............. 711/154 |

OTHER PUBLICATIONS

DVS Whitepaper, San in Postproduction Environment: Requirements and Solutions 2006, 38 pages.

* cited by examiner

*Primary Examiner* — Jared Rutz
(74) *Attorney, Agent, or Firm* — Weide & Miller, Ltd.

(57) ABSTRACT

A contiguous digital media storage system and method is disclosed. In one embodiment, the contiguous digital media storage system comprises a storage server, mass storage device, allocator subsystem, and metadata subsystem. Other embodiments may include additional storage servers or mass storage devices as well as one or more client devices. The system and method may be used with third party file systems. Generally, sequentially sensitive information is identified and stored contiguously based on its position within a sequence which substantially increases throughput. This position may be determined from information provided by client devices, file characteristics, or other ways. The system and method may store uniform and variable sized files contiguously.

23 Claims, 8 Drawing Sheets

STORAGE OF SEQUENTIALLY SENSITIVE DATA

BACKGROUND OF THE INVENTION

1. Field of the Invention

The invention relates to data storage and in particular to a system and method for recording and storing sequentially sensitive digital data such as digital media data so that it is physically contiguous and available for optimal retrieval speeds.

2. Related Art

Data storage technology has continued to improve throughout what has become known as the digital age. As a result, data storage devices have grown cheaper and faster with the passage of time. Data storage devices are still subject to some physical limitations, however, because devices such as hard drives still have moving parts. Currently, one of the most popular uses of the improvement in storage capacity and performance is the recording, editing and play back of digital media, including, but not limited to film, video, images, television, audio, and streaming media.

As media production has moved from film, video tape and audio tape to digital technology, fast and reliable storage of digital media has become vital. Digital media, like other digital data, may be stored in various ways including on magnetic tape, optical disks, or hard drives. In a digital media production environment, the hard drive is often utilized because of its combination of superior read and write access, large storage capacity, reliability, and speed.

The storage of digital media requires vast amounts of data storage capacity. This is especially true in digital media production where high resolution digital media is commonplace. For example, digital media for television and film typically have resolution ranging from 720×480 to 4096×3112 (i.e., 4 k) with frame rates ranging from 24 to 60 frames per second. However, emerging technologies, such as IMAX® theatres can have even greater resolution requirement. In addition, each color channel of the digital media may require between 8 and 10 bits of storage and up to 16 bits have been suggested.

It is known in the art that digital media may be compressed. Compression reduces the storage requirements, and consequently the data rate requirements for digital media. However, compression also adversely affects the quality of the digital media by introducing image artifacts or reducing detail. In digital media production environments, it is especially important to maintain the quality of digital media and thus uncompressed digital media, which preserves the original quality of the digital media, is preferred despite the additional resources it requires. The data storage requirements for uncompressed digital media are substantially greater than that of compressed digital media because the color, luminosity, and other aspects of every pixel are stored and maintained exactly.

The storage device used in recording, playing, or editing digital media must have sufficient throughput to read and write data in at least real time. If the throughput is insufficient then digital media frames can be dropped or skipped to the detriment of the overall quality of the digital media itself. In addition, editing may require even higher throughput than recording or play back because more than one digital media stream may be required such as to include special effects.

The throughput or data rate requirements for digital media are related to the storage requirements. For example, the compressed hour of digital media above at 720×480 would require a data rate of approximately 25 megabits per second and similar uncompressed digital media would require at data rate of 210 megabits per second. High definition digital media at 1920×1080 would respectively require 100 megabits per second or 1500 megabits per second for compressed and uncompressed digital media.

Thus, it can be seen that for both compressed and uncompressed digital media the data capacity and data rate for digital media storage devices is high and that these requirements are even higher in the realm of digital media editing or production.

It is known that reading fragmented or randomized data reduces disk throughput. Traditional systems have attempted to reduce data fragmentation, at least within individual files by executing defragmentation algorithms which attempt to identify individual files that have been subdivided with the divisions saved in discontinuous locations on a drive and move the divisions to an empty space large enough to store the entire file. Defragmentation is a complex and time consuming task especially given the file sizes and vast amounts of data required to store digital media. In fact, defragmentation of a disk can take several hours to several days, during which time the disk or array may have significantly reduced throughput or be completely unavailable for use. In addition, changing existing data (such as when editing digital media) or writing new data (such as when recording digital media) typically causes additional fragmentation and consequently slows the throughput of the drive and any array the drive is a part of.

Another situation that leads to randomizing and thus decreased performance occurs when multiple users (or even multiple programs) attempt to concurrently write a series of files to a shared storage device. Because there is no methodology currently in place to avoid randomizing, the two (or more) series of files written by concurrent users will almost invariably be interwoven with each other to at least some degree. The networked storage solutions currently available were specifically designed because multiple users often require access to the same data set. Thus, limiting access so there can be no concurrent use of such storage is rarely an acceptable option.

Thus, what is desired and disclosed herein is a system and method for recording and storing sequentially sensitive data in a physically contiguous manner on one or more disks.

SUMMARY OF THE INVENTION

A contiguous digital media storage system and method is disclosed herein. Generally, the system and method provide substantial increases in data throughput by storing data contiguously on a mass storage device. In one embodiment, the storage system comprises an allocator subsystem and a metadata subsystem on one or more memory devices. The allocator subsystem may be configured to identify sequentially sensitive data having a position within a sequence, and allocate one or more contiguous disk blocks on the mass storage device based on the position of the sequentially sensitive data within the sequence. The metadata subsystem may be configured to maintain file system information and may be in communication with the allocator subsystem. One or more client devices in communication with the allocator subsystem, the metadata subsystem, or both may write sequentially sensitive data to the one or more contiguous disk blocks allocated by the allocator subsystem.

Some embodiments utilize segments, each segment comprising a contiguous region on the mass storage device, wherein the allocator subsystem is configured to allocate contiguous disk blocks from the one or more segments based on the position of the sequentially sensitive data within a sequence. Segment size may be a predetermined fixed size, variable, or determined dynamically in one or more embodiments.

In these embodiments, the allocator subsystem may be configured to acquire a segment before allocating contiguous disk blocks from the segment. In addition, the allocator subsystem may be configured to allocate contiguous disk blocks for sequentially sensitive data belonging to a particular sequence from a segment previously acquired to store data from the particular sequence. In other words, the allocator subsystem may be configured to allocate contiguous disk blocks such that each segment only stores sequentially sensitive data for one particular sequence. Of course, where data from a particular sequence has not yet been stored on the mass storage device, the allocator subsystem may allocate contiguous disk blocks from a segment that has not previously been acquired (i.e. a new segment).

The storage system may use pad files in one or more embodiments. If the storage system utilizes pad files, the allocator subsystem may be configured to allocate contiguous disk blocks by freeing at least a portion of disk space occupied by one or more pad files. This allows the storage system of some embodiments to be used with third party metadata subsystems because the allocator subsystem, in effect, forces the third party metadata subsystem into allocating contiguous disk blocks through the use of one or more pad files.

Sequentially sensitive data may be identified by the allocator subsystem in various ways. In one embodiment, sequentially sensitive data is identified by receiving client information from the client devices, by analyzing one or more file characteristics, or both. Client information may be received through various manners including from one or more libraries on the client devices.

The storage method of one or more embodiments comprises: receiving sequentially sensitive data; identifying the position of the sequentially sensitive data within a sequence; allocating one or more contiguous disk blocks on a mass storage device based on the position of the sequentially sensitive data within the sequence; and writing the sequentially sensitive data to the one or more contiguous disk blocks. In embodiments with pad files, the method may further comprise creating one or more pad files on the mass storage device, and freeing at least a portion of the one or more pad files based on the position of the sequentially sensitive data within the sequence. As with above, sequentially sensitive data may be identified by receiving client information from the client devices, analyzing file characteristics, or both.

Some embodiments of the method may include creating one or more allocation areas on the mass storage device with each allocation area having one or more segments. In these embodiments, contiguous disk blocks would be allocated from the one or more segments within the allocation areas. In addition, the size of one or more of the segments may be a predetermined fixed size, variable, or determined dynamically.

In one embodiment, the method further comprises acquiring a particular segment based on a segment number, the segment number determined by taking the quotient resulting from dividing the position of the sequentially sensitive data by the average file quantity of the preceding segments. For instance, file number 64 would go into segment number 5 if the average number of files in the preceding segments was 12 (i.e., 64/12=5+4/12). If the particular segment has not previously been acquired the particular segment is assigned to the segment number. A file position may be determined by taking the remainder resulting from dividing the position of the sequentially sensitive data by the average file quantity for the preceding segments. Thus, in the previous example file number 64 would be the fourth file in segment number 5. It is noted that in embodiments that use pad files, at least a portion of the pad file or files at the file position may be freed prior to writing data to the file position. In this embodiment, allocating the contiguous disk blocks occurs by identifying the one or more contiguous disk blocks at the file position to the client devices.

In another embodiment, the method further comprises identifying a current segment, the current segment being a segment containing data immediately preceding the sequentially sensitive data to be stored. A particular segment may then be acquired, the particular segment being the current segment if there is a portion of free space sufficient to store the sequentially sensitive data within the current segment, the particular segment being a previously unacquired segment if the current segment has insufficient free space or if the immediately preceding data has not previously been written to the mass storage device. In embodiments utilizing pad files, at least a portion of the one or more pad files from the beginning of the one or more pad files within the particular segment may be freed prior to writing the sequentially sensitive data to the particular segment. In this embodiment, allocating the one or more contiguous disk blocks occurs by identifying the contiguous disk blocks corresponding to the beginning of the portion of free space within the particular segment. As with the above, each segment may store only sequentially sensitive data for one particular sequence in one or more embodiments of the method.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
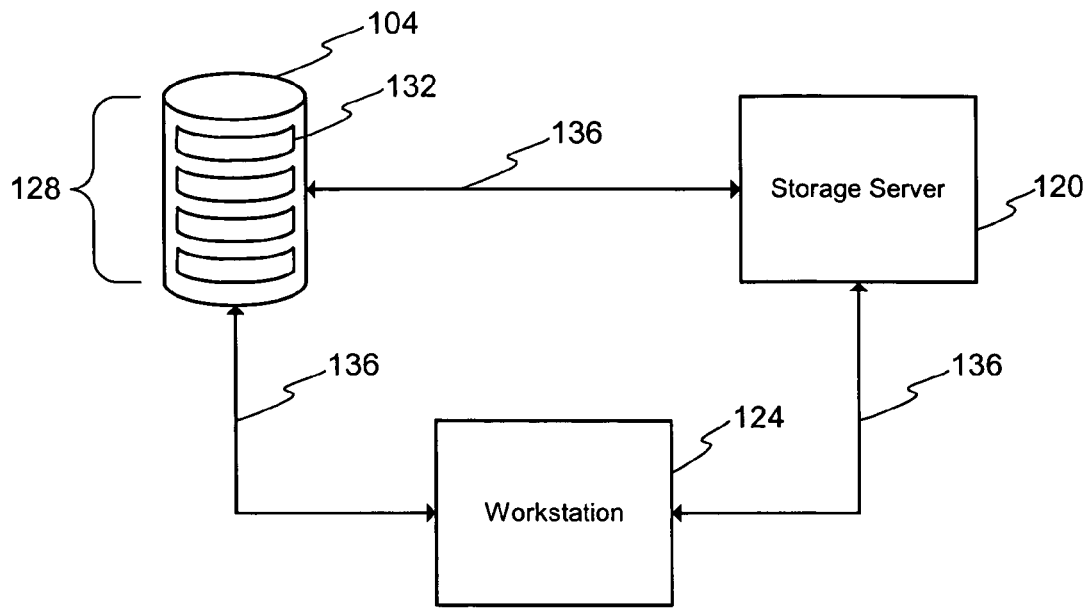
FIG. 1 is a block diagram illustrating an embodiment of the contiguous data storage system.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Central to the problem of storing digital media is the notion that traditional technologies, such as Storage Area Networks (SAN) or Network Attached Storage (NAS) do nothing to prevent or hold off randomization of data, other than to run optimization or defragmentation routines which have been the state-of-the-art for the past few years. At least some or all of the following trade-offs for optimization exist: no access to data during the optimization process; optimizing may take hours or days; newly recorded material may need optimizing before use; rendered or concurrently recorded material will very likely need optimizing before use; and potentially significant reduced usable storage capacity.

As described above, performance of a storage system is critical when working with the high throughput requirements of digital media. Without an optimizing capability, performance is always subject to randomizing and therefore inherently unpredictable. With an optimizing capability, performance is predictable only if all data is optimized prior to use. Such optimizing will consume online time and bandwidth or offline time and may be unacceptable in some rapid turnover industries such as production of commercials. Additionally, for some systems, prolonged use and the accompanying scatter may render an optimization impossible without additional hardware.

Further, optimization algorithms or software generally operate on individual files. Thus, an individual file containing a series of frames may benefit from optimization. However, as is often the case with digital media editing, frames are stored as individual files and therefore each individual frame may be optimized but the series of frames (i.e., files) comprising a digital media remain scattered or randomized throughout the drive or array. As used herein, the term "fragmented" and like derivatives should be understood to include reference to a series of files being scattered or randomized on a storage medium unless it is clear that only the fragmentation of a single file is being referenced.

Even if an optimization algorithm is made aware of a series of frames or a sequence of files such as described above, the algorithm can still only function after a series of files have already been stored on the storage media in a fragmented manner. Thus, there continues to be a need for an optimization period where the disk or array has significantly reduced throughput or is unavailable for use. Optimization algorithms may detect when a disk is being accessed and discontinue optimization to allow the disk to be accessed. While this does allow the disk or array to become available for use, the data remains fragmented and the full throughput of the drive cannot be realized. In fact, in certain situations an aborted optimization routine may leave data in a more fragmented state than when the routine was started.

The detrimental effect of fragmentation on a storage system's performance can be independently proved by comparing sustained sequential access speed and sustained random access speed. For many drive manufacturers, this difference could be nearly two orders of magnitude—3,000 MB/s down to 100 MB/s. Typical RAID arrays and disks today see a 10× to 20× difference. The solution to all the stated issues above is a technology that records sequentially sensitive data, such as digital media, properly and remains unaffected by repeated write/erase cycles as projects come and go.

Disclosed herein is a system for storing digital media in a sequential manner in disk-based systems. In this manner, the detrimental effect on storage system performance is avoided because fragmentation and scatter is not permitted to occur. Consequently, the need for time and resource consuming optimization is eliminated. As is known in the art, digital media includes, but is not limited to film, video, images, television, audio, and streaming media. Though the term digital media is used herein, it is contemplated that any data that tends to be requested in large sequential amounts, or any data that is sequential in nature, can be stored according to and benefit from the disclosure herein.

Off the shelf IT computing technologies such as operating systems, file systems, and RAID do not address the data fragmentation caused by file scatter, especially over time as the RAID is used and files and projects are constantly removed with new files and projects of different sizes and/or formats taking their place. The invention disclosed herein provides high levels of efficiency and reliability for recording and playback from underlying physical media helping to deliver consistently high performance desired for digital media storage.

Generally, the invention disclosed herein provides the following advantages: lower maintenance requirements for the recording and playback of realtime, faster than realtime, and non-realtime applications; arbitrary format, multi-stream (concurrent) recording/playback of fixed frame, variable frame, and streaming formats including audio to the limit of underlying hardware; native recording (i.e. recording without translation of file formats) in support of all known open and proprietary formats now known or later developed; out of order recording for fixed frame rendering applications; and allowing recorded data to be instantly visible/available as one or more files to any connected or networked computer using industry standard file systems.

Those knowledgeable in the art will appreciate that the term "contiguous" or the phrase "physically contiguous" when applied to a hard disk drive will be synonymous with "logically contiguous" where the drive is generally free from defect. The disclosed invention generally relies on this correlation to control the logical position of data in order to achieve a correlated physical position. Therefore it should be appreciated that, if a given logical position correlates to a bad block on a drive, data in that block may be said to be logically contiguous to surrounding data in a sequence while not being physically contiguous to that data. However, where this occurrence is low, overall throughput will not be adversely affected and the overall sequence of data should still be understood to be physically contiguous.

Referring now to FIG. 1, a contiguous data storage system of various configurations is disclosed herein. In one embodiment, the data storage system is comprised of a mass storage device 104, a storage server 120, an allocator subsystem, and a metadata subsystem. In one or more embodiments, the data storage system may be accessed by one or more workstations 124 as will be described further below.

The elements of the data storage system may be connected to one another using various data connections 136 such as but not limited to SCSI, SAS, SATA, IEEE 1394, USB, Ethernet, Infiniband, and fiber channel. For example, in one embodiment the mass storage device 104 may be connected to one or more workstations 124, the storage server 120, or both via a fiber channel data connection 136. In the same embodiment, the storage server 120 may be connected to one or more workstations via Ethernet. In other embodiments, the elements of the system may be connected by a single type of data connection 136. In addition, elements of the system may be connected by more than one data connection 136 such as to provide additional throughput or redundancy. It is contemplated that any network or other data connection, including but not limited to wireless connections, now known or later developed that is capable of transferring data from one element of the system to another may be used.

The mass storage device 104 may take various forms, but will typically comprise a RAID array. One current preferred embodiment of the present invention makes use of a hardware enclosure utilizing RAID controllers, Model 3992 Turbo (part number M101544) manufactured by LSI configured as a RAID 5 array using 16 400 gigabyte fibre channel hard drives Model No. ST3400755FC manufactured by Seagate Technology LLC. However, any data storage device that involves some appreciable delay between the time data is requested and the time it is located on the data storage device may benefit from the invention. If configured as a RAID array, the mass storage device 104 will generally have a set 128 of individual hard drives or disks 132 combined to provide greater storage capacity and throughput than any single drive. These individual disks 132 may have a variety of interfaces now known and later developed such as SCSI, ATA, or Serial ATA and may be configured according to different RAID configurations.

In one embodiment, the mass storage device 104 may be configured for redundancy allowing it to continue operating without loss of data even if one or more individual disks 132 fail. In this embodiment, identical data may be simultaneously written to more than one disk 132, or some of the storage space of the entire mass storage device 104 may be dedicated to storing data sufficient to rebuild any data that is lost due to the failure of one or more drives. In another embodiment, the mass storage device 104 may be configured for speed rather than redundancy. In this configuration, data may be simultaneously written to (or read from) more than one disk 132 thereby increasing the throughput of the mass storage device 104 by combining the throughput of the individual disks 132. In yet another embodiment, the mass storage device 104 may be configured for both redundancy and speed such as by combining aspects of these configurations.

Some exemplary RAID configurations that may be used with the mass storage device 104 include RAID 0, RAID 5, and RAID 5+0. As is known in the art, RAID 0 combines the throughput of all disks 132 in the set 128 by splitting data among the disks but does not provide redundancy. RAID 5 requires at least 3 disks 132 and allocates storage space for parity data, typically an entire disk, to rebuild any data lost by the failure of one or more drives. RAID 5+0 combines two or more RAID 5 configurations into a RAID 0 configuration thus maintaining the high throughput of RAID 0 and the redundancy of RAID 5. Other configurations may be used for specific purposes. For instance RAID 6 is especially suitable for archiving and RAID 0 may be preferred for transportable units. Notably, other RAID configurations exist and the mass storage device 104 disclosed herein may be configured according to these RAID configurations as well as future configurations.

The contiguous data storage system is capable of being shared by multiple client devices through one or more data connections with these devices. Thus, it is contemplated that the mass storage device 104 may be in a SAN configuration, such as a SAN with multiple workstations connected to the mass storage device by fiber channel connections. Of course, the contiguous data storage system is applicable to other shared configurations, including those now known, such as a shared network drive, and those which have yet to be developed.

Figure 2:
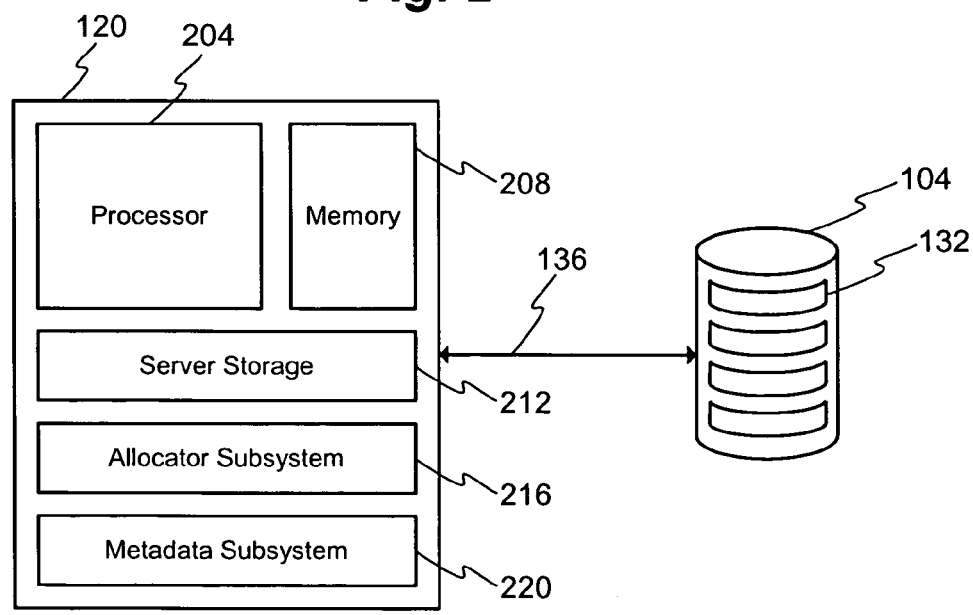
FIG. 2 is a block diagram illustrating an embodiment of a storage server and mass storage device.

Referring to FIG. 2, the mass storage device 104 is connected via a data connection 136 to a storage server 120 in one or more embodiments. Generally, the storage server 120 allows the one or more workstations 124 to read and write data to the mass storage 104. The storage server 120 in one or more embodiments comprises a processor 204, memory 208, server storage 212, an allocator subsystem 216, and a metadata subsystem 220. The processor 204, memory 208, and server storage 212 may respectively be a CPU, RAM, and hard drive or drives of a server, workstation, or other computer the operation of which is known in the art and will not be extensively described herein so as to not obscure the invention.

It is contemplated that the server 120 may comprise any combination of one or more processors 204, memory 208, and server storage 212 that is capable of interpreting, processing, and/or executing machine readable code from the memory 208, server storage 212, or both in one or more embodiments. Generally speaking, the processor 204 may be any device capable of executing machine readable code and transmitting and receiving data. The memory 208 and server storage 212 may be any data storage device or devices capable of storing data. The memory 208 and server storage 212 will typically allow both reading and writing data, however, in some embodiments at least a portion or all of either the memory 208 or server storage 212 may be read only.

In one or more embodiments, the storage server 120 may include an allocator subsystem 216, a metadata subsystem 220, or both. It is contemplated that these subsystems may be comprised of independent hardware components within the server 120, may be software or machine readable code configured to execute on the server, or a combination of both hardware and software. The allocator subsystem 216 and the metadata subsystem 220 of one or more embodiments may be stored on the memory 208, server storage 212, or removable storage media including but not limited to optical disks, flash memory, or removable magnetic media. The allocator subsystem 216 and the metadata subsystem 220 of one or more embodiments may utilize the memory 208, server storage 212, and processor 204 to store, process, retrieve, and communicate data required for these subsystems to operate. In addition, the allocator subsystem 216 and the metadata subsystem 220 may execute on different servers in one or more embodiments.

In one or more embodiments, the metadata subsystem 220 is configured to store, create, update, and delete metadata information which includes, but is not limited to, information regarding the location and block allocation of files stored and information regarding the free space on the mass storage device 104. The metadata subsystem 220 provides metadata information typically by identifying one or more specific disk blocks, to workstations, computers, or other client devices allowing the client devices to have direct block level access to the mass storage device 104. For example, a client device may request to read a file located on the mass storage device 104. In response to this request, the metadata subsystem 220, in one or more embodiments, provides, to the client device, the specific disk blocks where the requested file is stored according to the metadata information. Then, the client device may directly access theses disk blocks to read the file directly from the mass storage device 104. A client device may similarly write a file directly to the mass storage device 104. For a write request, the metadata subsystem 220 will provide the specific disk blocks where a file may be stored to the client device according to the metadata information. It is noted that, in one or more embodiments, writing or reading a file directly to or from the mass storage device generally means that the client device writes or reads data through its direct data connection with the mass storage device, and not through the storage server 120.

Though the term disk block is used herein generally with regard to hard disk or other disk based storage, it is contemplated that disk blocks may refer to a data storage block on disk based technologies as well as other storage technologies, including for example, flash memory, holographic or molecular storage, random access memory (RAM), DNA and other chemical storage, and magnetic random access memory (MRAM).

Notably, a data connection 136 between the storage server 120 and the mass storage device 104, as shown in FIG. 2, is not required for the contiguous data storage system to operate properly. In one or more embodiments, the metadata subsystem 220 stores metadata information on the server storage 212. As long as the metadata information accurately reflects the actual file system structure on the mass storage device 104, there is no need for a data connection 136 between the storage server 120 and the mass storage device. However, a data connection 136 between the storage server 120 and the mass storage device 104 may be used in configurations where there is a potential for changes in the actual file structure of the mass storage device to not be represented in the metadata information.

In one or more embodiments, the metadata subsystem 220 and allocator subsystem 216 may be configured to transmit and receive data to and from one another. In this way, the allocator subsystem 216 may access the metadata information or other information maintained by the metadata subsystem 220, may provide allocation information to the metadata subsystem, or both. Allocation information includes, but is not limited to, information identifying the one or more disk blocks where data or a file may be written by a client device.

Generally, the allocator subsystem 216 is configured to allocate physically contiguous disk blocks to a client device when the device makes a request to store or write data. Allocation of disk blocks in this manner will be explained further below. In addition, the allocator subsystem 216 is aware or may be made aware that the data to be stored is sequentially sensitive data and may consequently allocate a physically contiguous disk region such that the sequentially sensitive data is physically positioned according to its position in a sequence even if other data from the same sequence has not yet been stored.

Sequentially sensitive data may be thought of as individual data or files that are generally written, read, edited, or otherwise used in a sequence. Thus, each individual file has a position or order within its sequence. In one embodiment, the sequentially sensitive data is individual frames of a digital media clip where each frame is an individual image file. Some common examples of these files include Digital Picture Exchange (.dpx), JPEG (.jpg) and Tagged Image File Format (.tiff). To play the digital media clip each of its individual files is displayed in sequence from the first image to the last image. Similarly, a digital media clip may be recorded by writing the individual frames in the order they are captured.

Thus, it can be seen that storing sequentially sensitive data in sequence improves the throughput of the mass storage device 104 because sequentially sensitive data may be written and read in sequence. This greatly reduces repositioning of the read/write head(s) in the mass storage device 104. Such repositioning is detrimental to the throughput of the mass storage device 104 and occurs more frequently as data fragmentation increases.

Figure 3:
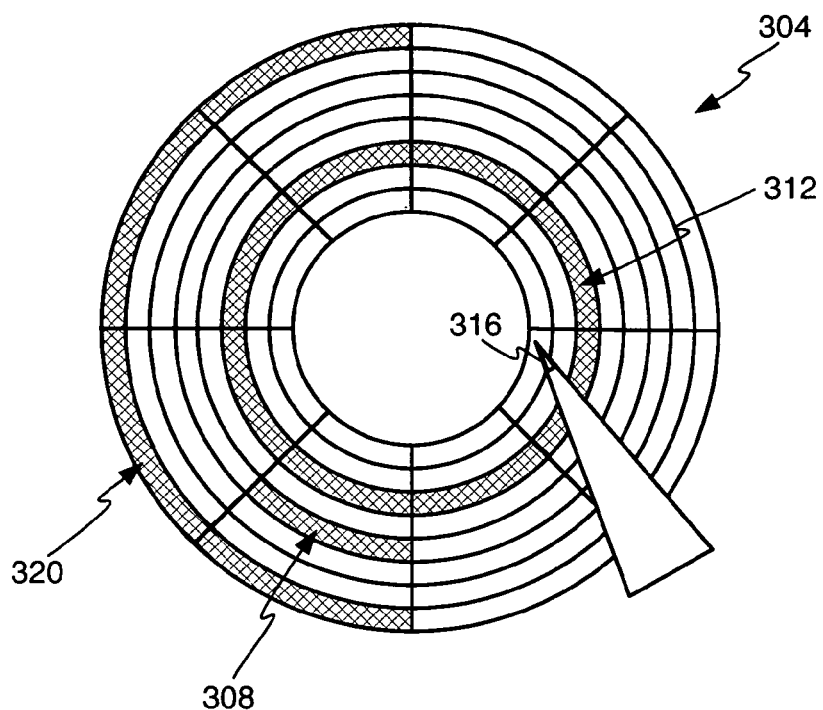
FIG. 3 illustrates a top view of an exemplary hard disk platter and read/write head.

For example, referring to FIG. 3, which illustrates the sectors 308 and tracks 312 as well as the read/write head 316 associated with a hard disk platter 304, it can be seen that the allocator subsystem may greatly reduce the repositioning of the read/write head 316 by allocating disk regions that are physically contiguous such as by allocating disk regions that are contiguous along one or more tracks 312 of a hard disk. It will be appreciated by those skilled in the art that while the example refers to a single disk, the principles are also applicable to a RAID array which uses several individual hard drives. Although the RAID controller may naturally stripe the contents of a first file over more than one disk, this first file would not be considered fragmented. Further, a second file which is the next file to the first file in a sequence of files would not be considered scattered in relation to the first file if portions of the second file were striped to a disk in the RAID array that contained no portion of the first file. Rather, the first and second files would be considered contiguous if the stripes for the first and second file that were on the same disk in the RAID array were contiguous with each other.

The operation of the allocation subsystem will now be described. In one or more embodiments, the mass storage device 104 must be prepared to store sequentially sensitive data by creating one or more allocation areas 320 for storing this data. Preferably each allocation area is reserved exclusively for the storage of sequentially sensitive data and additional space outside of the allocation area may be used for the storage of data that is not sequentially sensitive. An allocation area 320 is preferably comprised of one or more contiguous sectors 308 of a hard disk, but may comprise other contiguous regions of a hard disk. Each allocation area 320 may then be divided into segments as illustrated in FIG. 4.

Figure 4:
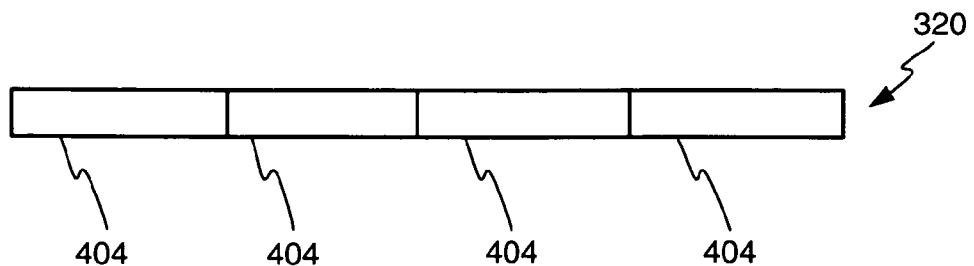
FIG. 4 illustrates an embodiment of a segment.

FIG. 4 is a linear illustration of an allocation area 320 that has been divided into segments 404. In one embodiment, each segment 404 is preferably of a predetermined fixed size. In other embodiments, the size of each segment may vary and/or may be determined dynamically. The purpose of the segment is to assure that each clip is provided ample room for the storage the sequentially sensitive data that comprises the clip. Thus, it is desirable to limit each segment to the storage of no more than one clip. Once the at least one allocation area 320 with at least one segment 404 has been created, data may be stored on the contiguous data storage system.

Figure 9:
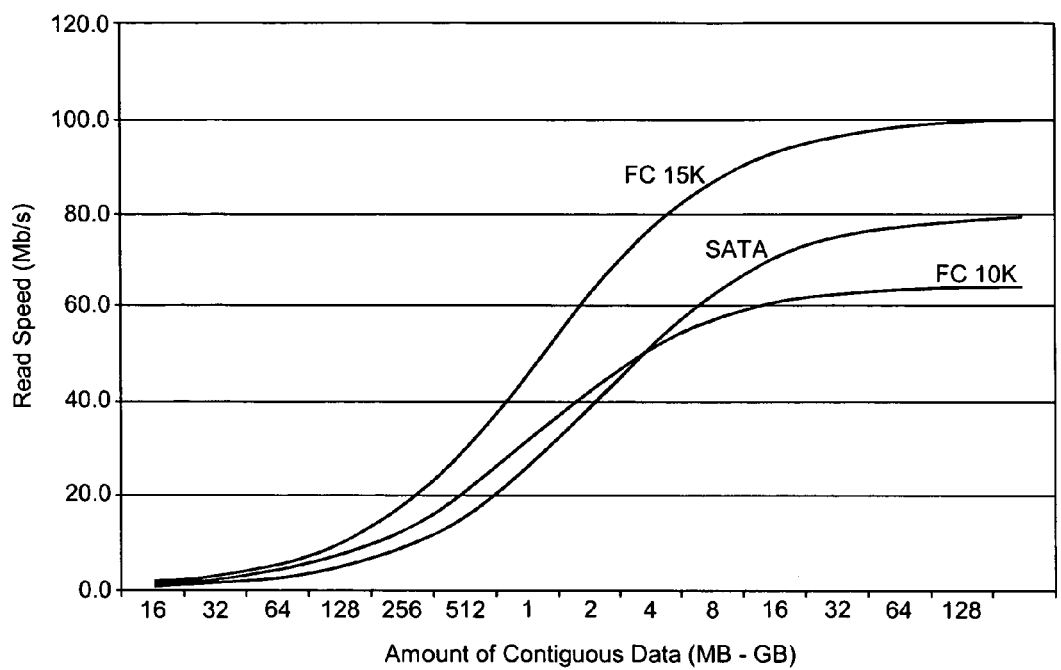
FIG. 9 is a graph showing the performance improvement of the contiguously stored data.

Generally, the optimal size of a segment is determined based on the underlying hardware. Mainly the physical limitations (e.g., average seek times and maximum disk rotation speeds) and properties (e.g., cache size of the individual drives and RAID controller) of the components that make up the storage device. For example, FIG. 9 shows the relationship between data request size (which is correlated to segment size) and throughput for three different individual 400 GB drives manufactured by Seagate Technology LLC.

As can be seen, larger requests (i.e., larger segments) tend to provide increased data reading (i.e., playback) performance. However, there comes a point where increasing segment size results in very little appreciable performance gain. Also, larger segments may result in more space in the allocated storage area being wasted as segments become partially filled. Thus, the segment size will ideally be kept as small as possible while still providing the desired level of performance. Most if not all hard drive based storage systems, whether they comprise an individual drive, RAID, or JBOD, will exhibit a performance curve as illustrated in FIG. 9.

Based on currently available drives, each segment will be typically be greater than 8 megabytes and less than 4 gigabytes. As an example, in one preferred embodiment using fixed-sized segments, the segment size is 1 gigabyte where the hardware comprising the storage media is a hardware enclosure utilizing RAID controllers, Model 3992 Turbo (part number M101544) manufactured by LSI configured as a RAID 5 array using 16 400 gigabyte fibre channel hard drives Model No. ST3400755FC manufactured by Seagate Technology LLC.

Figure 5A:
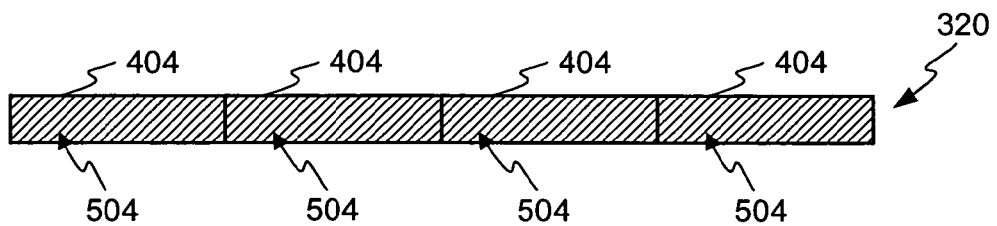
FIGS. 5A-5C illustrate writing data contiguously to a segment according to an embodiment of the contiguous data storage system.
Figure 5B:
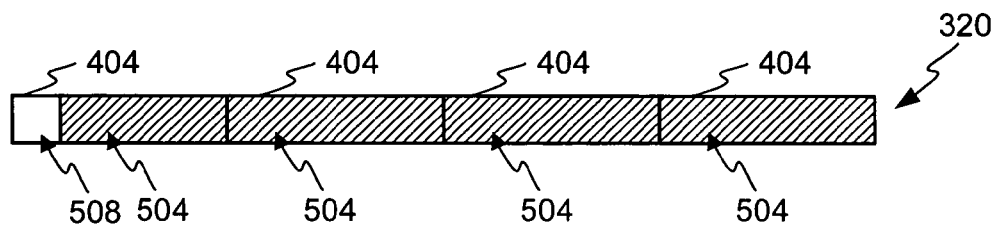
Figure 5C:
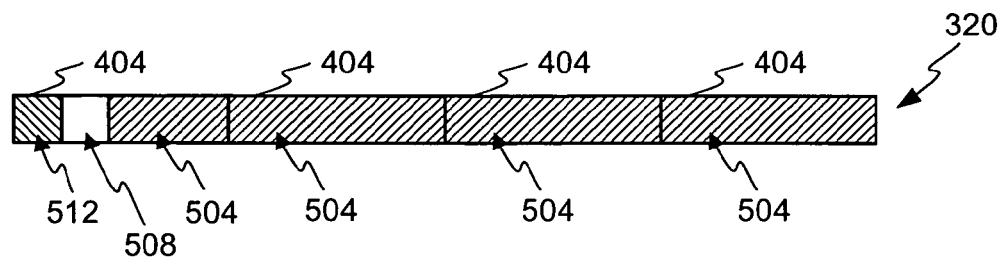

The allocation subsystem may interact with the metadata subsystem and mass storage device in various ways when allocating physically contiguous disk blocks. In one embodiment, the allocator subsystem is used in conjunction with a commercially available file system. In one preferred embodiment the file system is the StorNext® File System (SNFS) by Quantum. Once data is written to storage, the SNFS or other commercially available file system operates independent of the allocator subsystem to read the data and allow a user to review the data by, for example, showing the files organized into folders. However, in the process of writing the data to the allocated space, the allocator subsystem may in effect force the metadata subsystem and the SNFS or other commercially available file system to only allocate physically contiguous disk blocks in response to write requests from client devices. FIGS. 5A-5C illustrate an example of this. Referring to FIG. 5A, the allocator subsystem fills each segment 404 with a pad file 504. In one or more embodiments, pad files may be created by indicating the desired number of disk blocks are occupied in the metadata information. When a client device makes a file write request, the allocator subsystem removes blocks from the pad file at a desired location, typically the physical beginning of the pad file 504, to create an amount of free space 508 sufficient to store the file as illustrated in FIG. 5B. Now, the only available area to store the file is the free space 508 and thus the metadata subsystem is forced to provide the disk blocks which form the free space 508 to the client device. The client device may then write the file to the free space 508 using the commercially available file system. It can thus be seen that the physical placement of files on a disk may be controlled in this manner. When a client device wishes to write the next file in sequence, a similar process is engaged to create free space 508 contiguous with the previous file as illustrated in FIG. 5C. This process may continue until the allocation area 320 is filled and continue further on one or more other allocation areas. It is noted that neither the allocation areas 320 nor the segments 404 therein have to be physically contiguous to other allocation areas or segments that may hold additional files in a sequence as a substantial benefit in throughput is gained (primarily through reduced movement of the read/write head) simply by storing the data contiguously within individual segments 404.

It is also noted that, more than one pad file 504 may be used in a segment and that creation and removal of pad files may occur by simply marking the pad files containing the desired disk blocks on the mass storage device as occupied or free in the metadata information without writing any data to the mass storage device itself. Similarly, removal of blocks from a pad file may occur by marking the blocks as free in the metadata information.

Finally, it is noted that the use of a pad file, allows the contiguous data storage system to utilize one or more third party file systems. For instance, in one preferred embodiment SNFS is used. In embodiments which utilize a pad file, the contiguous data storage system herein allows a third party file system to be used to organize data on the mass storage device because the allocator subsystem forces the third party file system to allocate disk blocks from physically contiguous regions. As described above, this generally occurs by filling a segment with the pad file and freeing blocks that are physically contiguous when a file is to be written. A third party file system would ordinarily allocate random disk blocks when a file is to be written and would make no effort to locate disk blocks contiguous to the position of the file preceding the file to be written in a sequence. However, because the only free space is the contiguous blocks, the file system allocates blocks in a contiguous manner.

Figure 5D:
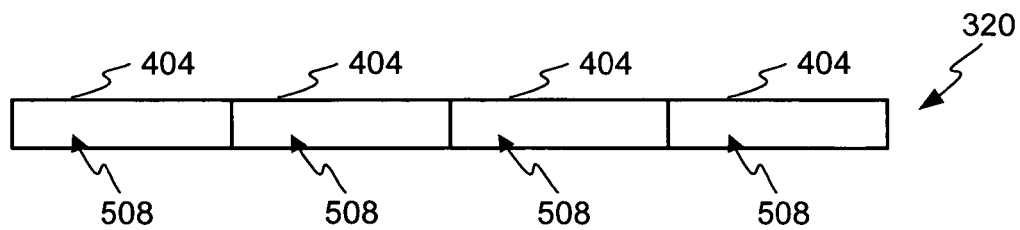
FIGS. 5D-5F illustrate writing data contiguously to a segment according to another embodiment of the contiguous data storage system.
Figure 5E:
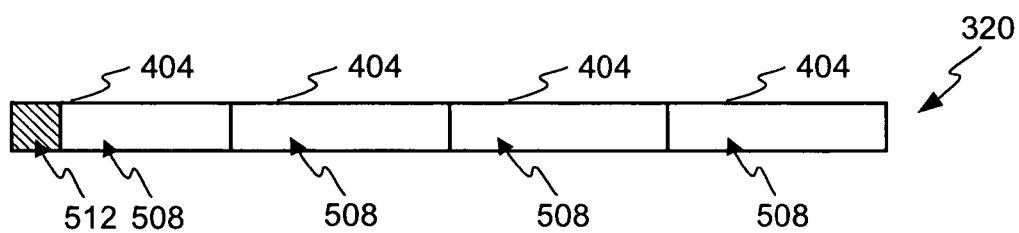
Figure 5F:
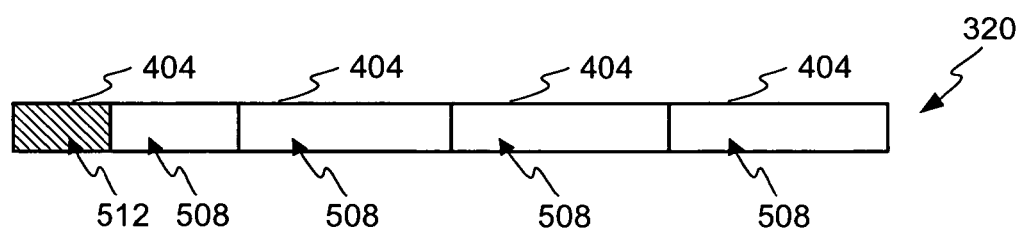

In another embodiment, the allocator subsystem, metadata subsystem, or both depending on the embodiment, may simply allocate the next physically contiguous region of disk blocks by communicating the disk blocks that it desires to the metadata subsystem without use of one or more pad files. FIGS. 5D-5E illustrate this. For example, each segment of an allocation area 320 starts as free space 508 as illustrated in FIG. 5D. Upon receiving a write request, the allocator subsystem would request a specific region of disk blocks and provide the same to the client device. The client device may then write the file 512 as illustrated in FIG. 5E. The allocator subsystem may then allocate a physically contiguous region of disk blocks for the next file allowing the client device to write the next file physically contiguous with the first as illustrated in FIG. 5F. In such an embodiment, no third party file system is used or required.

The allocation subsystem may operate differently depending on the type of sequentially sensitive data to be stored. In one embodiment, the allocation subsystem may operate in one way if the sequentially sensitive data comprises files of uniform size such as illustrated in FIG. 6.

Figure 6:
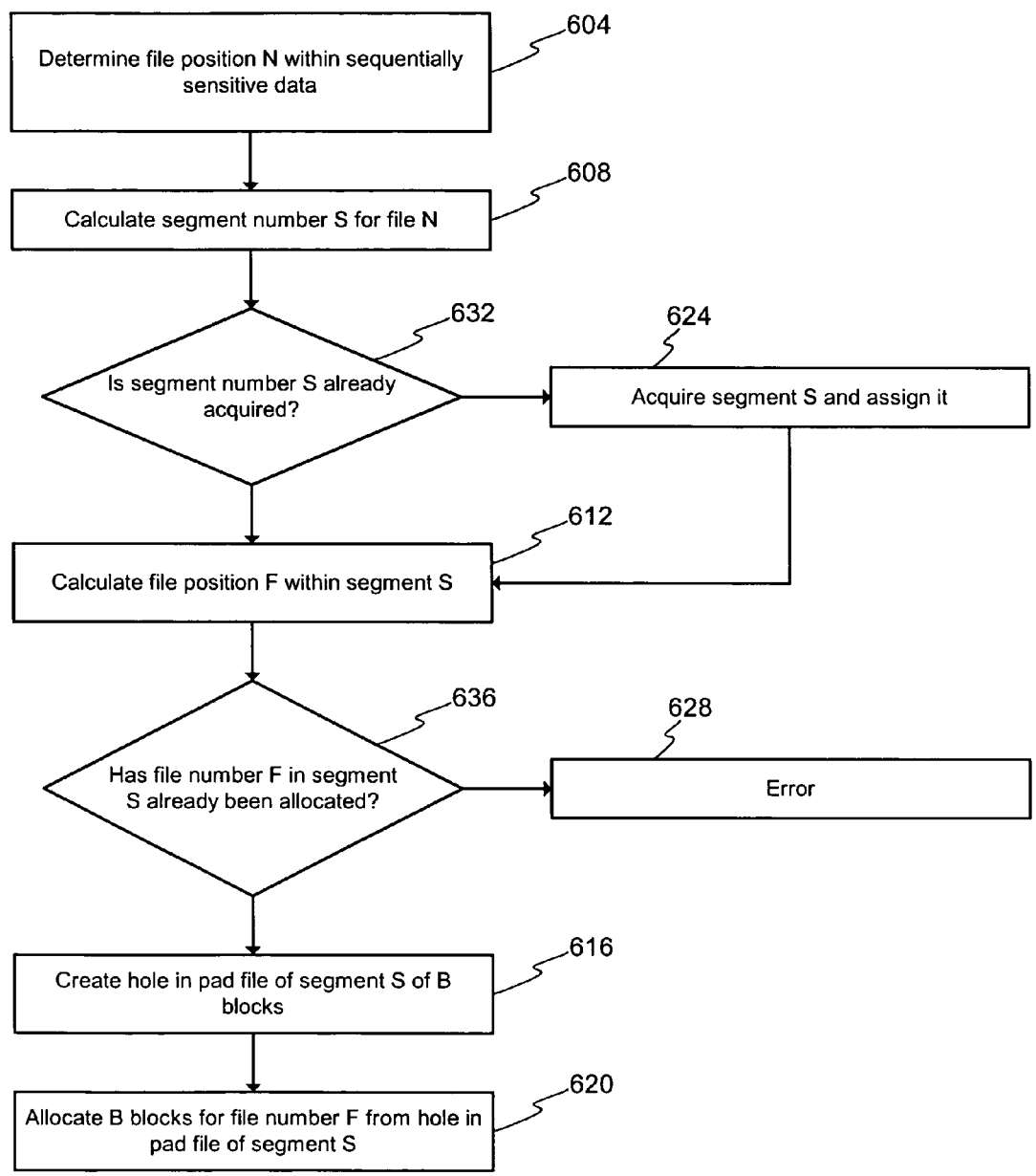
FIG. 6 is a flow diagram illustrating the storage of a uniform size file according to an embodiment of the contiguous data storage system.

In FIG. 6, the allocator subsystem has received a file write request from a client device. At a step 604, the allocator subsystem determines the file's position N in the sequentially sensitive data. This may be accomplished in various ways, such as but not limited to analyzing the file's name or other file characteristics, or retrieving or receiving client information including but not limited to file position information provided by the client device (such as through an API as discussed below). For example, the file may be named "digital media_frame.003.dpx" to show that it is the third file in the sequence. Even if the files named "digital media_frame.001.dpx" and "digital media_frame.002.dpx" have not yet been written or created, the desired position for "digital media_frame.003.dpx" can be calculated because the preceding two files are (or more aptly, will be) of a fixed, predetermined size.

At a step 608, the segment number S where the file is to be stored is calculated. This may be accomplished by taking the quotient calculated by dividing the file's position N by the number of files that can be stored per segment K. This is generally known in the art as a div function and calculation of the segment number may be stated as S=N div K.

The number of files that can be stored per segment K may be determined by taking an average of the number of files stored in preceding segments. For example, a file at position 64 within a sequence would go into segment number 5 if the average number of files in the preceding segments was 12 (i.e., 64/12=5+4/12). It is noted that the segment number identifies a particular segment in one or more embodiments and, as such, the segment number may be any identifier capable of identifying a particular segment in one or more embodiments.

At a decision step 632, it is determined if segment number S has previously been acquired. For example, at decision step 632, it may be determined if segment number S for a particular sequence of files has previously been acquired. If the segment number S has previously been acquired, then at a step 612 the file position F within the segment is calculated by taking the remainder calculated by dividing the file's position N by the number of files that can be stored per segment K. This is generally known in the art as a mod function and calculation of the file position F within the segment may be stated as $F=N \bmod K$. Thus, regarding the previous example, the file at position 64 would be the fourth file in segment number 5. If the segment number S has not been previously acquired, then in step 624 a segment is acquired by assigning the segment to segment number S.

As stated above, the benefits of the contiguous data storage device do not require segments to by physically contiguous on the mass storage device. Thus, acquiring a segment at step 612 may occur by locating the first (or any other) un-acquired segment and assigning it segment number S. In one or more embodiments, the allocator subsystem may communicate with the metadata subsystem to locate such an un-acquired segment.

With the file position F and segment number S the allocator subsystem may check if file position F has already been allocated at a decision step 636. This may be accomplished by the allocator subsystem querying the metadata information through the metadata subsystem. If file position F has been previously allocated, then the allocator subsystem may enter an error state at a step 628. The error would notify the user that the data could not be written because an allocation conflict exists. Of course, the allocator subsystem may also allocate contiguous disk blocks at file position F as discussed below to allow any data already at file position F to be overwritten if it is so desired.

If file position F has not been previously allocated, then a region of free space at file position F is freed at a step 616 by removing one or more pad files or a portion of a pad file as described above. The size of the free space freed at step 616 will be equivalent to the number of blocks B required to store the file. It is contemplated that in embodiments that do not utilize pad files, step 616 may be skipped and the allocator subsystem may proceed directly to allocating disk blocks.

At a step 620, the allocator subsystem may then allocate the number of blocks B required to store the file at file position N within the segment assigned to segment number S. As stated, the allocator subsystem in one or more embodiments allocates the blocks B by identifying these blocks to a client device which may then write a file to the blocks through communication between the client device and the mass storage device.

Thus, as FIG. 6 illustrates, sequentially sensitive data comprising uniform sized files may be stored such that they are physically contiguous. In addition, FIG. 6 illustrates how files are physically written according to the position they occupy in a sequence to ensure that, at least within a segment, the files are physically stored in sequence. When all files in a sequence are of a predeterminable size the present invention allows the files to be generated out of order and recorded as they are generated, but the files are recorded at physical locations such that the final sequence will be in order and contiguous, at least within the segments. Thus, the files may be read in sequence which, as stated, greatly improves the throughput of the mass storage device.

Figure 7:
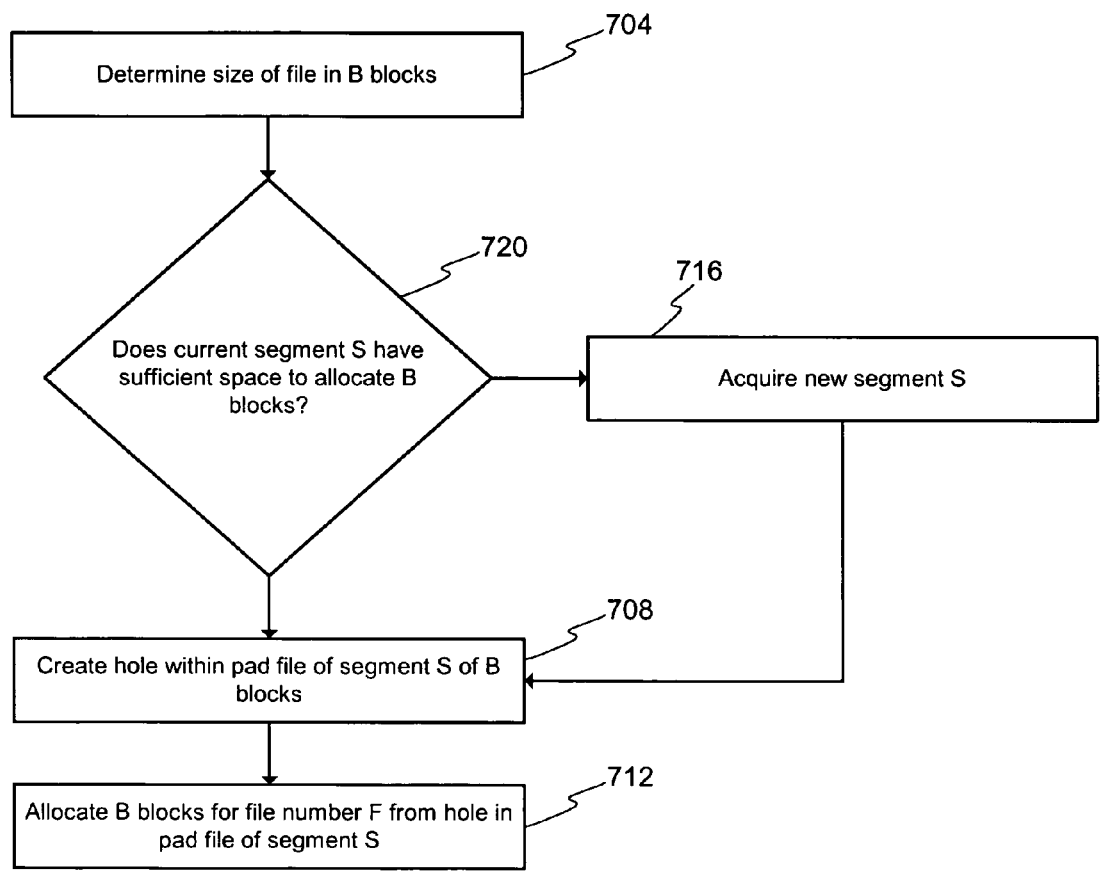
FIG. 7 is a flow diagram illustrating the storage of a variable size file according to an embodiment of the contiguous data storage system.

In another embodiment, the allocation subsystem may operate in a different way if the sequentially sensitive data comprises files of variable size such as illustrated in FIG. 7. In FIG. 7, the allocator subsystem has received a file write request from a client device. At a step 704, the allocator subsystem determines the number of blocks B required to store the file. At a decision step 720, the allocator subsystem determines if there is sufficient space to allocate B blocks in the current segment S. Current segment S will typically contain the file in a sequence that immediately precedes the file that is currently being written. Such determination may occur in various ways. In embodiments that do not utilize pad files, the determination may occur such as by the allocator subsystem querying the metadata information through the metadata subsystem for free space information and determining if the number of blocks of free space are sufficient to store B blocks. In embodiments utilizing pad files, there is sufficient space to allocate B blocks if the current segment's pad file is equal to or larger in size than B blocks.

Thus, if the current segment's pad file is smaller than the amount of space required to store the file, then there is insufficient space in the current segment and at a step 716 a new segment is acquired by assigning a segment number, as described above, to store the file. If the current segment's pad file is equal to or larger in size than the amount of space required to store the file, then the current segment is acquired and the file may be stored therein. It is contemplated that a new segment may be also be acquired in the situation where the file is the first file of a particular sequence to be stored on the mass storage device.

Once a segment has been acquired, blocks may be removed or freed from the physical beginning of the pad file, at a step 708, to create free space for the file. The number of blocks freed from the pad file is at least the number of blocks B required to store the file. Once the required number of blocks has been freed, the allocator subsystem may allocate the blocks, as described above, to allow a client device to write the file to the freed space. In embodiments that do not utilize a pad file, step 708 may be skipped and step 712 may occur by the allocator subsystem allocating the number of blocks B required to store the file from the beginning of the free space in a segment once such segment has been properly acquired.

As described above, the contiguous data storage system can function with sequentially sensitive data of both uniform and variable size. Thus, the system is capable of supporting all known current and future file formats natively (i.e. without translation of the file format) because these formats will either be uniform or variable formats. Additionally, it is not necessary for the system to know any other characteristics of the format. Therefore, it can be used with both open and proprietary file formats.

The contiguous data storage system may determine whether sequentially sensitive data is uniform or variable size in a number of ways. In one embodiment, the allocator subsystem may make this determination by analyzing file characteristics including but not limited to file names, file types, file extensions, and file formats. In other embodiments, the allocator subsystem may receive client information from the client devices including but not limited to position information, file type information (e.g. uniform or variable size file type), and file size information.

As stated above, the allocator subsystem and the metadata subsystem may be configured to cooperate in various ways. For example, referring to FIG. 6, the allocator subsystem may perform the calculations necessary to ensure that files are stored contiguously, such as in steps 608 and 612, by requesting metadata information from the metadata subsystem. The requested metadata information could include information regarding the number of uniform sized files that may be stored per segment, whether a segment has been assigned a segment number (i.e. acquired), and whether a particular file position has already been allocated. The allocator subsystem may also be configured to then instruct the metadata subsystem to free a number of blocks within a pad file based on the metadata information it has received. Depending on the configuration, the allocator subsystem may then identify these freed blocks to the client devices itself or the metadata subsystem may identify the blocks to the client devices. The client devices may then write data directly to the blocks.

It is also contemplated that in some embodiments only the metadata subsystem communicates with client devices while in other embodiments only the allocator subsystem communicates with clients. This may occur in embodiments where only one of the subsystems is configured to receive read and write communications from the client devices and identify the requested disk blocks to the client devices. For example, the allocator subsystem may receive and respond to client requests by querying the metadata information through the metadata subsystem to determine where a file may be stored (or where a file is located) and subsequently identifying the corresponding disk blocks to a client device. Of course, in some embodiments, both subsystems may be configured to communicate with client devices. For example, the allocator subsystem may be configured to respond to write requests (because it determines how to store data contiguously) while the metadata subsystem is configured to respond to read requests.

Figure 8:
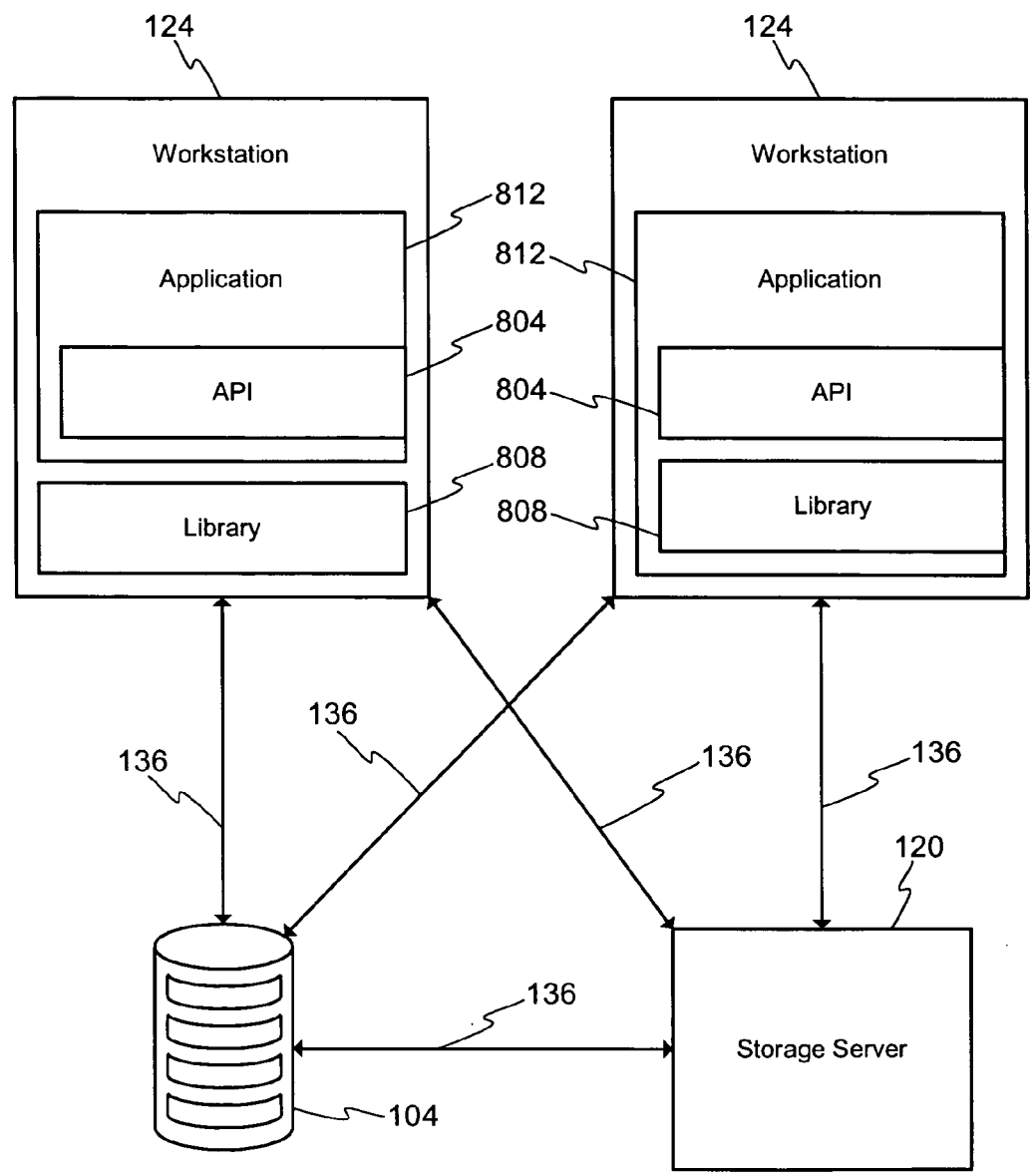
FIG. 8 is a block diagram illustrating an embodiment of the contiguous data storage system.

Referring to FIG. 8, in some embodiments the contiguous data storage system may further comprise an Application Programming Interface (API) 804 and a library 808. Of course, in other embodiments there may be a plurality of APIs 804, libraries 808, or both within the system.

Generally, the API 804 allows applications 812 or other processes on a workstation 124 to interface with or access a library 808. This may be accomplished by various methods now known and later developed. As the example embodiment of FIG. 8 illustrates, the library 808 may be object code that is linked to the application 812 when the application is compiled, or the library may be compiled into the object code of the application itself. The library 808 in turn provides communications with the storage server 120 such as by communicating with its allocator subsystem, metadata subsystem, or both. The library 808 may also be part of the operating system such as in the form of a storage device driver. It is noted that more than one application 812 on a particular workstation 124 may access the same library 808 at the same time.

With the API 804, application developers can include physically contiguous data storage capabilities into their applications. It is noted however, that even applications that do not use the API 804 may store data contiguously according to the invention herein because the storage server 120 may be configured to detect sequentially sensitive data, such as by analysis of the file names and types, and automatically store such data contiguously.

Regarding the API 804, a clip is a sequence of data. Commonly for visual media, a clip is a sequence of images or frames where the frames are stored in one or more files (i.e., a single file may contain more than one frame). A clip could also be audio media and/or mixed visual and audio media. Also, it should be understood that a clip, as used herein, could be any sequence of files where a user or other program identifies the data in those files as being sequentially sensitive. One advantage of the API 804 is that an application 812 may communicate file information, such as file ordering or sequence, with the storage server 120. This communication prevents the storage server 120 from having to detect sequentially sensitive data and then having to determine the data's position in a sequence. Another advantage is that applications 812 utilizing the API 804 have finer control over any data they wish to store or retrieve. For example, an application 812 utilizing the API 804 may communicate file information to the storage server 120 identifying the exact file position number of a particular frame within a sequence.

Through the API 804, an application 812 may open individual frames for recording, editing, or playback. The application 812 may call a function to open a frame at a particular location within a clip or to open the next frame in sequence within a clip. The application would then be able to record a digital media image to the frame, edit a digital media image already in the frame, or retrieve the digital media image in the frame for playback. Thus, through the API 804 and library 808, the application 812 is communicating file information to the storage server 120, and based on this information the storage server is then able to deliver, through its allocator and metadata subsystems, contiguous disks blocks to the application during its storage and retrieval of digital media data.

For example, if an application is recording, the application would first open a clip and then open individual frames to record each individual digital media image as it is captured. Each request to open a frame returns contiguous disk blocks from the storage server's 120 metadata or allocator subsystem thus storing the digital media contiguously on the mass storage device 104. If an application is editing, the application would open a clip containing the desired frames, edit one or more particular frames, and save the edited frames in their original locations thus preserving the contiguous storage of the digital media. If an application is playing back digital media, the application would open a clip containing the frames to be played back and retrieve the frames sequentially from the mass storage device 104. The rate at which these frames can be retrieved and recorded is greatly enhanced by the fact that they have been stored contiguously according to the invention herein. It is contemplated that, in one or more embodiments, the API 804 may operate on individual frames or a set of frames without first having to open a clip.

If a file has already been written to the storage device along with a second file following in sequence in the same segment, it may be necessary to move both files, along with any other files later in the sequence, if the first file does not have sufficient space to grow. However, where editing does not increase the file's size, the edited file may simply be written over the prior version and thus, physical sequencing is maintained. The API 804 may provide a function to delete data as well. In one embodiment, such function may mark a clip as available for recovery by the contiguous data storage system. This would allow the disk blocks occupied by the clip to be reallocated to store other files. In one or more embodiments, marking a clip as available for recovery causes the storage server to free the space occupied by the clip. It is noted that in embodiments utilizing a pad file, one or more pad files may be created or expanded to fill the disk blocks formerly used by the clip. It is contemplated that, the space occupied by the clip may be freed by marking such space as free in the metadata information. It is also contemplated that deletion of a clip may occur by known file deletion methods. Individual or sets of frames may be deleted according to these methods as well.

The API 804 of one embodiment provides function calls to initialize the library 808, close the library, check if the library is enabled, open a clip, close a clip, check if a particular clip is open, delete a clip, open a specific frame or the next frame in a sequence, close a frame, get workspace information, and return error messages. It is contemplated that in other embodiments additional or fewer functional calls may be provided. For example, an API 804 may only provide functions to initialize and close the library, and to open and close frames.

The following paragraphs describe example functions of one embodiment of the API 804 and are discussed from the context of an application 812 utilizing the library 808 through the API 804. These functions are defined according to the C programming language, however, other languages may be used.

As discussed in the following, the data type ERRNO is a numerical type variable used to store numerical error codes. The data type PLATFORM_HANDLE is a file handle returned for use in standard input/output function calls. The data types UINT64_T and UINT32_T are 64 bit and 32 bit unsigned integer data types respectively. The data type Clip identifies a clip and the data type WSInfoPtr is a pointer to a workspace information data structure.

An initialize library function such as InitLibrary(const char* name) may be provided to initialize the library. The function may return zero if successful, or a predefined error code if unsuccessful. An application-supplied string of space-separated elements may be passed to the API through the name variable. The first element may be an application-related identifier (such as, but not required to be, argv[0]) and may be used in naming certain application-specific files. Additional elements of this string may be provided as desired.

A close library function such as CloseLibrary(void) may be provided. Such a function should be called prior to exiting the calling application to ensure related resources are properly terminated and released along with the application. This function may return zero if successful or a predefined error code if unsuccessful.

A workspace enabled function such as IsEnabled(const char* path) may be provided. Generally a workspace may be thought of as a directory on the mass storage device, however, it is contemplated that a workspace may also be another identifier for a collection of related sequential files. This function may be used to determine if the target directory, represented by path, is currently configured for storing and retrieving data contiguously. Depending on the embodiment and current system state, the function may validly return false to this call, indicating contiguous storage and retrieval operations are currently disabled for the target directory. Generally however, this function will return true or false based on whether the storage server is currently managing the workspace represented by path to ensure contiguous data storage.

A retrieve workspace information function may be provided such as GetWorkspaceInfo(const char* path, WSInfoPtr wsInfo). This function may be used to retrieve various state information about the workspace represented by path. State information may include information such as available recording space, space occupied, file counts, and directory creation and modification dates. An error is returned if path does not refer to a currently enabled workspace. If the function is successfully executed, workspace information is stored and returned to the calling application in a wsInfo type variable.

A function to determine whether a clip is open may be provided such as ClipIsOpen(Clip targetclip). This function determines the state of a clip, represented by targetclip. The function returns true or false depending on the open state of the clip represented by targetclip.

An open clip function may be provided such as OpenClip (const char* localpath, UINT64_T frameSize, const char * clipName, int perm). This function may be used to initialize the state of the clip represented by targetClip and prepare a workspace to deliver frames of size frameSize in path localPath to the calling application. The directory represented by localpath may be created if it does not exist. Clips having a variable frame size or a uniform frame size may be opened by this function. For example, setting the frameSize to zero may indicate that a variable frame size clip (such as a JPEG file) is being opened. Alternatively, a non-zero frameSize may indicate a uniform or fixed frame size clip (such as a DPX file) is being opened. Generally, the function will return an identifier to the opened clip. If an error occurs the function returns zero.

An application-defined identifier string associated with the created clip may be represented by the variable clipName. If no clipName is provided by the calling application, the clip will not be able to be reopened. If multiple OpenClip calls are made with identical clipName, the resultant frames will all be considered part of the same clip allocation. The variable perm allows the calling application to provide the Unix-style permission mask to be applied to the directory localPath, if it needs to be created. If this argument is zero, the default is 0755. This argument may be ignored on Windows client platforms.

A close clip function such as CloseClip(Clip targetclip) may be provided. This function may be used to terminate and finalize processing related to the clip referred to by targetclip. The function returns zero if successful, and a predefined error code if unsuccessful.

A delete clip function may be provided such as DeleteClip (const char* localPath, const char * clipName). This function may be used to mark a clip as available for recovery by the storage server. For example, a temporary clip recording may be deleted after it has been viewed. The function returns zero if successful, and a predefined error code if unsuccessful. In this function, localPath is the path to the resultant clip and clipName is the application-supplied identifier of the clip.

A function to open the next frame in a sequence may be provided such as OpenNextFrame(Clip targetClip, const char* frameName, UINT64_T frameSize, int flags, int perm). This function may be used to request the next frame of size frameSize from the allocator or metadata subsystem. The variable frameSize may vary from call to call. The function will generally return a PLATFORM_HANDLE data type if successfully executed. The PLATFORM_HANDLE may be a standard file handle associated with the contiguous disk blocks delivered by the storage server. If unsuccessful, zero is returned. The variable targetclip should refer to a valid and open clip for proper execution of the function. The variable frameName is the application-determined file system name of the frame to be opened. The variable perm represents the Unix-style permission mask to be applied to the created frame. If zero, perm defaults to 0644. This argument may be ignored on Windows client platforms.

A function to open a particular frame in a clip may be provided such as OpenFrameAt(Clip targetclip, const char* frameName, size_t seqNum, int flags, int perm). This function may use seqNum to return a frame from the allocator subsystem of a uniform or fixed size, such as defined when the corresponding clip was opened, properly positioned in the implied recording sequence. As with the above, the function may return a PLATFORM_HANDLE data type associated with the contiguous disk blocks delivered by the storage server if successfully executed, and zero if unsuccessful. The variable targetclip should refer to a valid and open clip for proper execution of the function. The variable frameName is the file system name of the frame to be opened, as determined by the calling application. The variable seqNum represents the position of the frame in the current clip, as determined by the calling application. Finally, the variable perm represents the file system permission mask to be applied to the created frame.

A close frame function may be provided such as CloseFrame(Clip targetclip, PLATFORM_HANDLE frame, char* frameNameBuf, size_t frameNameBufLen). This function finalizes a frame, makes it visible to the calling application as a file in the target path, and returns to the calling application the fully determined path of the resulting frame. The function may return zero if successful, and a predefined error code if the operation fails. The variable targetclip should refer to a valid, open clip to which frame is associated and the variable frame should refer to a valid, open frame. The variable frameNameBuf is a character buffer created and owned by the calling application. If provided, this buffer will receive the full path of the created frame. The variable frameNameBufLen may represent the length of the character buffer frameNameBuf. If frameNameBufLen is not large enough, frameNameBuf will receive an empty string. If zero, no path will be returned.

A function to set an error code may be provided such as SetLastError(ERRNO err, const char * msg). This function may be provided as a convenience function to allow the calling application to provide application-specific error codes and messages instead of the contiguous data storage system's existing error codes. For example, to allow an application to remap an existing error code to an error code the application already handles. The variable err represents the error number to be set and the variable msg represents text for the error number as will be defined by the calling application.

A function to get the last error code may be provided such as GetLastError(void). This function can be used to get the most recent error condition stored by the contiguous data storage system for this application or application thread. It represents the most recent error code.

A function to get the text of the last error may be provided such as GetLastErrorText(void). This function allows the calling application to gain additional information (typically for human debugging or logging purposes) about the context in which an error occurred. In other words, the function returns a character pointer representing the error text of the most recent error condition.

An additional aspect of the invention herein that may be included in some embodiments is an application monitor. Generally, the application monitor is used with applications that do not incorporate the API. The application monitor in one or more embodiments, monitors data output from an application and provides file information, such as sequence information, on-the-fly as the data is created. This is particularly advantageous in render farm workflows where multiple workstations are working on individual frames concurrently and the frames are all part of the same clip. Using the present invention, rendered material is near-instantly available and viewable at full bandwidth for playback or other uses.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A contiguous digital media storage system comprising:
    at least one memory device storing machine readable code executable by one or more processors the memory having one or more allocation areas thereon, each allocation area having one or more segments and one or more contiguous blocks are allocated from the one or more segments, the machine readable code comprising;
    an allocator subsystem, the allocator subsystem configured to:
        identify a position of sequentially sensitive data within a sequence of data to be stored on a mass storage device, the identifying may occur by receiving client information from one or more client devices, analyzing one or more file characteristics, or both,
        acquire a particular segment from the one or more segments based on a segment number, the segment number determined by taking a quotient resulting from dividing the position of the sequentially sensitive data by an average file quantity for one or more preceding segments;
        assign the particular segment to the segment number if the particular segment has not previously been acquired; and
        determine a file position within the particular segment, the file position determined by taking a remainder resulting from dividing the position of the sequentially sensitive data by the average file quantity for the one or more preceding segments and
        allocate one or more contiguous blocks on the mass storage device, a location of the one or more contiguous blocks based on the position of the sequentially sensitive data within the sequence of data to be stored on the mass storage device; and
    a metadata subsystem, the metadata subsystem in communication with the allocator subsystem and configured to maintain file system information, wherein the allocator subsystem, the metadata subsystem, or both are configured to communicate with one or more client devices to write the sequentially sensitive data from the one or more client devices to the one or more contiguous blocks allocated by the allocator subsystem based on the position of the sequentially sensitive data in relation to the sequence of data to be stored on the mass storage device.

2. The storage system of claim 1 further comprising one or more segments, each segment comprising a contiguous region on the mass storage device, wherein the allocator subsystem is configured to allocate contiguous blocks within the one or more segments based on the position of the sequentially sensitive data within the sequence.

3. The storage system of claim 2, wherein the allocator subsystem is configured to acquire one segment of the one or more segments prior to allocating any contiguous blocks within the segment.

4. The storage system of claim 2, wherein the allocator subsystem is configured to allocate contiguous blocks such that each segment of the one or more segments only stores sequentially sensitive data for one particular sequence.

5. The storage system of claim 1, wherein the allocator subsystem is configured to identify sequentially sensitive data by receiving client information from one or more libraries on the one or more client devices, by analyzing one or more file characteristics, or both.

6. The storage system of claim 1, wherein the allocator subsystem is configured to allocate contiguous blocks by freeing at least a portion of disk space occupied by one or more pad files.

7. The storage system of claim 1, wherein the metadata subsystem comprises a third party file system.

8. The storage system of claim 1, wherein the at least one memory device stores machine readable code comprising only the allocator subsystem.

9. A data storage system comprising:
a mass storage device, the mass storage device comprising one or more allocation areas on the mass storage device, each allocation area having one or more segments, each segment comprising a contiguous region on the mass storage device;
at least one storage server, the at least one storage server further comprising:
an allocator subsystem, the allocator subsystem configured to:
receive sequentially sensitive data having a position within a sequence of data;
identify the position of the sequentially sensitive data in relation to the sequence of data, wherein identifying comprises receiving client information from one or more client devices, analyzing one or more file characteristics, or both;
acquiring a particular segment from the one or more segments based on a segment number, the segment number determined by taking a quotient resulting from dividing the position of the sequentially sensitive data by an average file quantity for one or more preceding segments;
assigning the particular segment to the segment number if the particular segment has not previously been acquired; and
determining a file position within the particular segment, the file position determined by taking a remainder resulting from dividing the position of the sequentially sensitive data by the average file quantity for the one or more preceding segments, and
allocate one or more contiguous blocks within a segment based on the position of the sequentially sensitive data within the sequence;
a metadata subsystem, the metadata subsystem in communication with the allocator subsystem and configured to maintain file system information;
wherein the allocator subsystem, the metadata subsystem, or both are configured to communicate with one or more client devices to write sequentially sensitive data to the one or more contiguous blocks allocated by the allocator subsystem.

10. The storage system of claim 9, wherein the allocator subsystem is configured to acquire one segment of the one or more segments prior to allocating any contiguous blocks within the segment.

11. The storage system of claim 9, wherein the allocator subsystem is configured to allocate contiguous blocks for sequentially sensitive data belonging to a particular sequence from a segment of the one or more segments previously acquired to store data from the particular sequence, or from a segment of the one or more segments that has not previously been acquired.

12. The storage system of claim 9, wherein the allocator subsystem is configured to identify sequentially sensitive data by receiving client information from one or more libraries on the one or more client devices, by analyzing one or more file characteristics, or both.

13. The storage system of claim 9, wherein the allocator subsystem is configured to allocate contiguous blocks by freeing at least a portion disk space occupied by one or more pad files.

14. The storage system of claim 13, wherein the one or more segments is prepared by filling each of the one or more segments with one or more pad files.

15. The storage system of claim 9, wherein the size of one or more of the one or more segments is a predetermined fixed size.

16. The storage system of claim 9, wherein the size of one or more of the one or more segments is variable or determined dynamically.

17. The storage system of claim 9, wherein the metadata subsystem comprises a third party file system.

18. A method for contiguous digital media storage comprising:
receiving sequentially sensitive data;
identifying a position of the sequentially sensitive data within a sequence;
creating one or more allocation areas on the mass storage device, each allocation area having one or more segments;
acquiring a particular segment from the one or more segments based on a segment number, the segment number determined by taking the quotient resulting from dividing the position of the sequentially sensitive data by an average file quantity for one or more preceding segments;
assigning the particular segment to the segment number if the particular segment has not previously been acquired;
determining a file position within the particular segment, the file position determined by taking the remainder resulting from dividing the position of the sequentially sensitive data by the average file quantity for the one or more preceding segments;
allocating one or more contiguous blocks on a mass storage device from the one or more segments based on the position of the sequentially sensitive data within the sequence and by identifying the one or more contiguous blocks at the file position to one or more client devices; and
writing the sequentially sensitive data to the one or more contiguous blocks.

19. The method for contiguous storage of claim 18 further comprising:
creating one or more pad files on the mass storage device; and
freeing a portion of the one or more pad files based on the position of the sequentially sensitive data within the sequence.

20. The method for contiguous storage of claim 18 further comprising:
identifying a current segment from the one or more segments, the current segment being a segment containing data immediately preceding the sequentially sensitive data;
acquiring a particular segment from the one or more segments, the particular segment being the current segment if there is a portion of free space sufficient to store the sequentially sensitive data within the current segment, the particular segment being a previously unacquired segment if the current segment has insufficient free space to store the sequentially sensitive data or if the data immediately preceding the sequentially sensitive data has not previously been written to the mass storage device; and
wherein allocating the one or more contiguous blocks occurs by identifying the one or more contiguous blocks corresponding to the beginning of the portion of free space within the particular segment to one or more client devices.

21. The method for contiguous storage of claim 18, wherein each segment of the one or more segments only stores sequentially sensitive data for one particular sequence.

22. The method for contiguous storage of claim 18, wherein the size of one or more of the one or more segments is a predetermined fixed size.

23. The method for contiguous storage of claim 18, wherein the size of one or more of the one or more segments is variable and is determined dynamically.

* * * * *